United States Patent Office 3,503,897
Patented Mar. 31, 1970

3,503,897
PREPARATION OF ALFIN CATALYST
William R. Birchall, Cincinnati, Ohio, and Leo H. Broering, Fort Wright, Ky., assignors to National Distillers and Chemical Corporation, New York, N.Y., a corporation of Virginia
No Drawing. Filed Aug. 31, 1967, Ser. No. 664,613
Int. Cl. C08f *29/12, 3/02;* C08d *3/14*
U.S. Cl. 252—429        8 Claims

ABSTRACT OF THE DISCLOSURE

A process for preparing alfin catalysts is provided wherein the formation of agglomerates or balls of sodium metal during the reaction is avoided by maintaining the concentration of free sodium in the catalyst reaction mixture at not more than about 1.5% by weight.

---

This invention relates to a process for preparing alfin catalysts composed of a sodium alkoxide, a sodium alkenyl compound, and an alkali metal halide, formed from sodium metal, a methyl carbinol, an alkyl halide and a mono-olefin, and more particularly to a process for preparing such alfin catalysts wherein the formation of agglomerates or balls of sodium metal during the reaction is avoided by maintaining the concentration of free sodium in the reaction mixture at not more than about 1.5% by weight.

Morton and coworkers in a series of papers in the Journal of the American Chemical Society, starting in 1947, describe an organoalkali metal catalyst for the polymerization of olefins and particularly dienes which they term an alfin catalyst, Journal of the American Chemical Society 69 161; 167; 950; 1675; 2224 (1947). The name alfin is taken from the use of an *al*cohol and an ole*fin* in their preparation. The alcohol, a methyl n-alkyl carbinol, usually isopropanol, in the form of the sodium salt, and the olefin, also in the form of the sodium salt, and an alkali metal halide form a complex that constitutes the catalyst.

These catalysts are reported by Morton et al. to cause the polymerization of butadiene, isoprene and other dienes, alone and together with other copolymerizable organic compounds, in most cases olefinic in nature. The catalyst was discovered in the course of a study of the addition of organosodium compounds to dienes. Later on, Morton summarized the work done up until 1950 in Industrial and Engineering Chemistry, 42 1488–1496 (1950).

The polymers obtained using alfin catalysts are termed alfin polymers or alfin rubbers, and contain sodium in the molecule. Because of the speed and ease of the reaction, these attracted considerable interest in the 1940's and early 1950's. However, the very speed of the reaction led to problems. The alfin rubbers have the disadvantage of having an extremely high molecular weight, generally in excess of 3,000,000, and frequently in excess of 10,000,000. As a result, although these polymers are generally gel-free and have high tensile strength, superior abrasion resistance, and tear strength, they are also very tough, and exhibit little breakdown and consequently poor banding on the mill. Therefore, they are difficult if not impossible to process using conventional equipment. Consequently, interest and research in the alfin rubbers until recently was minimal, and in their original form the alfin rubbers have found very little commercial application., Pfau et al. U.S. Patents Nos. 2,964,083, granted Dec. 13, 1960, and 3,074,902, granted Jan. 22, 1963, endeavored to reduce the working viscosity of the alfin polymers by the incorporation of liquid plasticizers, particularly petroleum hydrocarbon oil. The resulting products were indicated to the particularly useful in the manufacture of tire treads.

For the first time, alfin rubbers of relatively low and medium molecular weight ranging from about 50,000 to about 1,250,000 were provided by Greenberg et al. U.S. Patents Nos. 3,067,187, granted Dec. 4, 1962, and 3,223,691, granted Dec. 14, 1965. This restriction on molecular weight was made possible by incorporation of a molecular weight moderator, a dihydroaromatic compound, with the alfin catalyst during the polymerization. As a result, commercial interest in the alfin polymers has been renewed, and with it interest in large-scale preparation of alfin catalysts.

Morton describes the preparation of the catalyst used in the alfin rubber process. Amylsodium is prepared from amylchloride by reaction with sodium metal. Alcohol is added to destroy half or more of the amylsodium, thereby furnishing the alkoxide in a finely-divided state. Propylene is then passed into the mixture. All operations are carried out in a high speed stirring apparatus, under an atmosphere of dry nitrogen. Half of the product is sodium chloride, which remains with the catalyst. From some preparations, gentle centrifuging or decanting will throw out first the traces of sodium metal left by failure of the first step, formation of amylsodium, to proceed 100%, and secondly, the small amount of blue sodium chloride that often accompanies the reaction. The remainder is the mixture of catalyst and sodium chloride that remains suspended indefinitely. In general, the alkoxide must be derived from a secondary alcohol, one branch of which is a methyl group, and the olefin must have the essential system —CH=CHCH$_2$—.

An alfin catalyst of satisfactory activity also can be obtained by inverting the order of reaction of the components, and substituting n-butyl chloride for n-amyl chloride. In this process, the sodium isopropoxide is formed by direct reaction of isopropyl alcohol with sodium, instead of with alkyl sodium, with a saving of one-half of the alkyl halide. The reaction of n-butyl chloride with sodium gives an almost quantitative yield of butylsodium. The butylsodium is stabilized immediately by its coordination with the sodium isopropoxide that is formed first. Such a catalyst can be prepared at ambient temperatures, up to and including the boiling point of the solvent employed for dispersing the sodium.

In the above-mentioned processes of preparing alfin catalysts, the reaction is carried out by, first, adding to the reactor all of the sodium in the form of a dispersion required for the formation of the alfin catalyst, and then adding all of the isopropyl alcohol required and then all of the n-butyl chloride required to form the sodium isopropoxide and butylsodium, and finally adding the propylent to form the allyl sodium. Where amyl chloride is employed instead of n-butyl chloride, all of the required sodium in form of dispersion is reacted with all of the amyl chloride to form amylsodium and then the isopropanol is reacted with amylsodium and then the propylene is reacted with amylsodium.

It has been found that when the preparation of the alfin catalysts is carried out by initially adding to the reactor all of the sodium metal in the form of a dispersion required in the preparation of the alfin catalysts, if any large or any undispersed particles of sodium metal are present, and/or if the dispersion is not highly stable, there is a tendency for the sodium metal to agglomerate and form sodium balls. Frequently, with continued agitation, these agglomerates or balls of sodium metal grow to such a size that the reaction must be stopped and the preparation abandoned, because it is mechanically impossible to handle, and difficult or dangerous to dispose of. In any case, sodium agglomerates do not as readily react with the alkyl halides and the alcohol, slow down the reaction.

and may form an undesirable sodium residue in the completed alfin catalyst. Any such residual agglomerates or balls of sodium can cause considerable difficulty in pumping and metering the alfin catalyst slurry for use in alfin polymerizations, and will cause an aberration in the polymerization, since sodium can react with an olefin in the Wurtz reaction.

In accordance with this invention, the formation of agglomerates or balls of sodium metal in the reaction mixture in the preparation of alfin catalysts is reduced or eliminated by maintaining the concentration of free sodium at not more than about 1.5% by weight of the reaction mixture. If the concentration of free sodium is maintained below such a level, even if agglomerates or balls of sodium metal are formed, their size is such that neither the catalyst composition nor the handling characteristics or reactivity of the catalyst are materially affected.

The invention accordingly provides alfin catalysts containing reduced amounts or substantially no agglomerates or balls of sodium metal and a sodium alkoxide, a sodium alkenyl compound, and an alkali metal halide in appropriate proportions to one another, and having desirable handling characteristics.

In carrying out the process of the instant invention, wherein sodium metal in the form of a dispersion is reacted with a methyl n-alkyl carbinol and alkyl halide, the reaction mixture never contains a concentration of free sodium in excess of about 1.5% by weight of the reaction mixture.

The dispersion of sodium, and the alcohol, and the dispersion of sodium and the alkyl halide, can be blended at any rate, and in any manner, continuously or in increments so long as the concentration of free sodium in the reaction mixture at any one time is not more than 1.5% by weight of the entire reaction mixture.

Thus, for example, the preparation of the alfin catalyst can be carried out by blending a portion of the total amount of sodium metal with a portion of the total amount of alcohol while maintaining a concentration of free sodium in the reaction mixture at less than about 1.5%, and further increments can be added until all of the sodium metal has been reacted and then a further portion of the sodium metal can be blended with a portion of the alkyl halide while maintaining the concentration of free sodium in the reaction mixture at less than about 1.5%, and this step can be repeated until all of the alkyl halide has been reacted. Then, the olefin can be added, and the catalyst preparation continued in the usual way. The increments of sodium metal in each addition need not necessarily be equal. In practice, any number of increments can be blended, and any portion of the total amount of sodium metal can be blended in each increment, so long as the reaction mixture at any one time contains a concentration of free sodium of less than about 1.5%.

During each incremental reaction or during a continuous reaction, the sodium metal should be employed in a stoichiometric amount required to react with the alcohol. Furthermore, in order to ensure that there will be no unreacted sodium present in the final alfin catalyst, the alkyl halide is employed in a stoichiometric amount, and preferably in a slight excess over the stoichiometric amount required to react with the remaining sodium. The excess alkyl halide helps reduce the amount of sodium remaining in the reaction mixture. However, if desired, a slight excess of sodium can be present in the reactor at all times with the total free sodium concentration not to exceed 1.5% by weight of the reaction mixture, to ensure that the reaction proceeds in the same manner as in the conventional processes wherein all of the required sodium is charged to the reactor at the beginning of the preparation. An excess of olefin, preferably propylene, over that stoichiometrically required to react with the alkyl sodium compound formed from the reaction with the alkyl halide and the sodium, is desired to facilitate completion of the alkyl sodium formation. Normally, an excess of olefin, which can range from about 5 to about 25%, and preferably from about 10 to about 15%, is sufficient.

A particularly effective alfin catalyst is obtained when the sodium metal is employed in finely divided form in a dispersing medium. When such finely divided sodium is used, ordinary stirring devices may be employed instead of high-speed comminuting equipment. In addition, the use of finely divided sodium results in extremely high yields of butylsodium, sodium isopropoxide and allylsodium. Thus, the alfin catalyst and, consequently, the end products of the polymerization, wherein the alfin catalysts are employed, are substantially free of metallic sodium contaminants. In addition, catalyst activity can be more readily reproduced when finely divided sodium is used.

The amount of sodium in the dispersion is not critical, and can be adjusted to suit any alfin catalyst preparatory procedure that is desired. Usually, a sodium concentration within the range from about 2 to about 50% is satisfactory. If desired, a proportion of aluminum distearate can be employed in the sodium dispersion. Where aluminum distearate is employed in the sodium dispersion, it should be present in an amount within the range from about 2 to about 5% by weight of the sodium.

The inert diluent that is employed for dispersion of the sodium can be any liquid aliphatic or cycloaliphatic saturated hydrocarbon. The hydrocarbon should be a liquid under the conditions during which the sodium dispersion and the alfin catalyst are formed. This requires that it remain liquid at temperatures as low as −10° C. and below, and at temperatures as high as 25 to 80° C., the maximum temperature normally reached during alfin catalyst formation.

The satisfactory aliphatic hydrocarbon solvents include pentane, hexane, heptane, n-octane, isooctane, nonane and decane, as well as commercially available solvent mixtures including any of these hydrocarbons, such as Isopar C (a mixture of isoparaffins containing 70 to 80% 2,2,4-trimethylpentane), or odorless mineral spirits, boiling range 349 to 406° F. and Isopar E having the following composition.

| Component: | Wt. percent |
|---|---|
| 2,2,4-trimethylpentane | 2.2 |
| 2,5-dimethylhexane; 2,4-dimethylhexane | 4.8 |
| 2,3,4-trimethylpentane | 11.5 |
| 2,3,3-trimethylpentane | 21.1 |
| 3-methylheptane | 33.0 |
| 2,2,4-trimethylhexane | 6.2 |
| 3-methyl-4-ethylhexane; 3,4-dimethylheptane; 2,3-dimethylheptane; 3,3,4-trimethylhexane | 5.7 |
| 15 other iso-components | 13.7 |
| $C_9$ naphtha+$C_{10}$+ | 1.8 |
|  | 100.0 |

Also useful are cycloaliphatic hydrocarbons, such as cyclohexane, cyclopentane, methyl cyclohexane, and cycloheptane.

As indicated in Greenberg et al. Patents Nos. 3,067,187 and 3,223,691, finely-divided sodium dispersions having a maximum particle size of about 1 to 2 microns are prepared on a Gaulin mill. Such mills are well known, and form no part of this invention.

Where aluminum distearate is employed, it is usually preferable to combine the aluminum distearate with the diluent employed, and run this into the mixing apparatus, such as the Gaulin mill. Sodium metal is then added. The system must be placed under an inert gas, such as nitrogen, argon or helium, during the dispersion. The diluent is brought to a temperature at which the metallic sodium liquefies, and milling is then begun, to reduce the molten sodium to a small particle size. The sodium is dispersed and the finished dispersion is then stored under nitrogen or other inert gas to preserve its activity. When prepared and stored properly over an inert atmosphere, the dispersion is stable indefinitely.

It will, of course, be apparent that any milling or homogenizing equipment can be used in dispersion of the sodium in the inert diluent. The sodium can have an average particle size of up to 50 microns, but it is generally preferred that the equipment be capable of dispersing the sodium in the diluent to a particle size within the range from about 0.5 to about 10 microns. The temperature employed during the dispersion should be above the melting point of sodium, and, because sodium melts at 97.6° C., temperatures within the range of from about 100 to 120° C. are suitable. It is preferred to work at a temperature above 110° C. Excessively high temperatures are not desirable, because of the necessity of operating under pressure, using low boiling solvents.

The sodium dispersed in an inert diluent can be employed in the usual way in any desired preparation of alfin catalyst. The typical preparation of an alfin catalyst has been described above, and is described in sufficient detail in the Greenberg et al. Patents Nos. 3,067,187 and 3,223,691 and in the Morton articles supra, so that full details are not required here, and those skilled in the art will know from the following description how to utilize sodium dispersions in accordance with the invention in such preparations.

As the alchol component, used to form the sodium alkoxide, any methyl-n-alkyl carbinol having from one to about ten carbon atoms can be used, such as propanol, methyl-n-propyl carbinol, and methyl-n-butyl carbinol. Isopropanol is preferred.

The alkoxide will form at rather low temperatures, as low as −20° C. being satisfactory. There is no upper limit on reaction temperature. Consequently, the reaction temperature used is that suitable for metallation of the olefin.

The olefin has from about three to about ten carbon atoms, and must contain the group CH=CH—CH$_2$—. Propylene is preferred, giving allyl sodium, but butene-1, butene-2, pentene-1, pentene-2, and pentene-3 can also be used. Activity may decrease as the olefin molecular weight increases.

The preparation of the alfin catalyst is carried out by reaction of the sodium dispersion, alcohol and alkyl halide in the presence of the dispersing liquid used for the catalyst. This can be and preferably is the same as the inert diluent used for the sodium dispersion. Frequency, however, a lower-boiling hydrocarbon such as hexane is used, to facilitate separation later. Any inert aliphatic or cycloaliphatic hydrocarbon is satisfactory.

The olefin is metallated by use of an alkyl sodium, which is prepared in situ by reaction of sodium with an alkyl halide having from about three to about ten carbon atoms. n-Butyl chloride is preferred, but amyl chloride, hexyl chloride, hexyl bromide, heptyl chloride, amyl bromide, and octyl chloride can also be used.

The reaction will proceed at low temperatures, which is advantageous when the olefin is a gas, such as propylene. A temperature from about −25° C. to just below the boiling point of the lowest boiling component in the system can be employed. A temperature range of from about 25° to about 60° C. is preferred. From one-half to about thirty hours' reaction time is normally adequate.

In preparing the alfin catalyst, atmospheric pressure is normally used except during addition of the olefin when a slight positive pressure is desired to increase the olefin solubility in the reaction mass. For example, when propylene is employed, a pressure of from about 5 to about 25 p.s.i.g., and preferably about 10 to about 15 p.s.i.g., is adequate.

The reaction mixture can be prepared by mixing the catalyst diluent, sodium dispersion and alkyl halide, and then adding the alcohol. After the alkoxide has been formed, the olefin is added, and metallated. Excess olefin is removed, and the residue can be used as the alfin catalyst, without further treatment or purification. In this mehod, the sodium is first converted to the alkyl sodium, and half this is then converted to the alkoxide, while the remainder is converted to alkenyl sodium. During the reaction, the free sodium concentration in the reaction mixture is maintained at not more than about 1.5% to reduce formation of sodium metal agglomerates or balls. Preferably, in forming the alfin catalyst the alcohol is added to the sodium dispersion mixed with the catalyst diluent, forming the sodium alkoxide, and then adding the alkyl halide, and, finally the olefin. Again, the free sodium concentration in the reaction mixture at any stage of the reaction is maintained at not more than about 1.5%. This procedure requires half the amount of alkyl halide, and three-fourths the amount of sodium, required by the first procedure, and is, therefore, preferred in a commercial operation.

The alfin catalyst obtained can be employed in the alfin polymerization of a wide variety of unsaturated organic compounds, including aliphatic dienes such as 1,3-butadiene, 2,3-dimethyl-1,3-butadiene, isoprene, piperylene, 3-furyl-1,3-butadiene, 3-methoxy-1,3-butadiene, olefins, such as propylene, 1-butene, 1-pentene, aryl olefins, such as styrene, the various alkyl styrenes, p-chlorostyrene, p-methoxy-styrene, alpha-methyl-styrene, vinyl naphthalene, vinyl ether, vinyl furane, and other unsaturated hydrocarbons. Butadiene alone and combinations of butadiene and styrene are preferred polymerizable unsaturated compounds, and the polymerization of these is particularly enhanced by the aluminum distearate-containing alfin catalysts prepared in accordance with this invention.

The amount of alfin catalyst that is employed for the alfin polymerization is normally from about 1 to about 5 weight percent, based on the total sodium content, and preferably from about 1.8 to about 2.2 weight percent, based on the weight of the unsaturated organic compound.

The alfin polymerization reaction will proceed at atmospheric pressure and room temperature in a suitable reaction medium. The pressure and temperature conditions are not critical, however, and the reaction will proceed at any pressure within the range from about 1 to about 50 atmospheres and at any temperature within the range from about −25 to about +100° C.

Having regard to the foregoing disclosure, the following is claimed as the inventive and patentable embodiments thereof:

1. In the process for the manufacture of alfin catalysts consisting essentially of a sodium alkoxide, a sodium alkenyl compound, and an alkali metal halide, formed from free sodium, a methyl-n-alkyl carbinol, an alkyl halide and a mono-olefin, the improvement which comprises reducing the formation of agglomerates of free sodium during the reaction by maintaining a concentration of free sodium in the reaction mixture of at most about 1.5% by weight.

2. A process in accordance with claim 1, in which the free sodium has a particle size within the range from about 0.5 to about 50 microns.

3. A process in accordance with claim 1, wherein the methyl-n-alkyl carbinol is isopropyl alcohol.

4. A process in accordance with claim 1, wherein the alkyl halide is n-butyl chloride.

5. A process in accordance with claim 1 in which the alkyl halide is amyl chloride.

6. A process in accordance with claim 1 in which the mono-olefin is propylene.

7. A process in accordance with claim 1, wherein the methyl-n-alkyl carbinol is isopropyl alcohol, which is reacted in at least two increments with the free sodium, and the alkyl halide is n-butyl chloride, which is reacted in at least two increments with the free sodium, while maintaining the concentration of free sodium in the reaction mixture, during each incremental reaction at less than about 1.5% by weight.

8. A process in accordance with claim 1 which comprises adding the alcohol to a dispersion of free sodium while maintaining the concentration of free sodium in the reaction mixture at less than about 1.5% by weight, and forming the sodium alkoxide, adding to the alkyl halide a dispersion of free sodium, while maintaining the concentration of free sodium in the reaction mixture at less than about 1.5% by weight, and then adding the olefin and reacting the olefin with the free sodium and alkyl halide to form the alkenyl sodium.

References Cited

UNITED STATES PATENTS 3,317,437  5/1967  Hoffman _____ 252—431

DANIEL E. WYMAN, Primary Examiner

P. M. FRENCH, Assistant Examiner

U.S. Cl. X.R.

252—431